United States Patent [19]

Simonsen et al.

[11] Patent Number: 5,793,141

[45] Date of Patent: Aug. 11, 1998

[54] PLUG-IN MODULAR BRUSH CARTRIDGE

[75] Inventors: Glenn H. Simonsen, Brookfield; Jeffrey C. Hessenberger, Neosho, both of Wis.

[73] Assignee: Milwaukee Electric Tool Corp., Brookfield, Wis.

[21] Appl. No.: 496,248

[22] Filed: Jun. 28, 1995

[51] Int. Cl.$^6$ ................................................. H01R 39/38
[52] U.S. Cl. .................... 310/242; 310/245; 310/248; 310/249; 310/238
[58] Field of Search ........................... 310/242, 239, 310/245, 248, 249, 238

[56] References Cited

U.S. PATENT DOCUMENTS

| | | | |
|---|---|---|---|
| 3,867,659 | 2/1975 | Seaburg | 310/242 |
| 4,075,523 | 2/1978 | Lafferty, Sr. | 310/239 |
| 4,095,131 | 6/1978 | Febonio | 310/239 |
| 4,136,295 | 1/1979 | Sweet | 310/239 |
| 4,246,508 | 1/1981 | Zimmer | 310/242 |
| 4,266,155 | 5/1981 | Niemela | 310/239 |
| 4,329,612 | 5/1982 | Averill | 310/247 |
| 4,590,398 | 5/1986 | Nagamatsu | 310/239 |
| 4,926,075 | 5/1990 | Fushiya et al. | 310/50 |
| 4,963,779 | 10/1990 | Lentino et al. | 310/71 |
| 4,994,701 | 2/1991 | Bulick | 310/239 |
| 5,043,619 | 8/1991 | Kartman, Jr. | 310/242 |
| 5,198,712 | 3/1993 | Bolzan, Jr. et al. | 310/242 |
| 5,245,241 | 9/1993 | Gotoh | 310/242 |

FOREIGN PATENT DOCUMENTS 2252290  7/1992  United Kingdom ............. H02K 5/24

*Primary Examiner*—Thomas M. Dougherty
*Assistant Examiner*—Timothy A. Williams
*Attorney, Agent, or Firm*—Michael, Best & Friedrich

[57] ABSTRACT

The invention provides a brush cartridge for a commutator-type motor. The brush cartridge includes a housing that is made of an electrically conductive material and that has an integrally formed terminal so that the cartridge can be plugged into a circuit without the need for wiring. The brush cartridge also includes a brush supported in the housing for sliding movement relative thereto and a spring member for biasing the brush into engagement with a commutator on the motor when the cartridge is installed. The brush cartridge also includes a flexible shunt connected between the housing and the brush. The shunt limits the range of sliding movement of the brush to permanently retain the brush in the housing.

27 Claims, 4 Drawing Sheets

PLUG-IN MODULAR BRUSH CARTRIDGE

BACKGROUND OF THE INVENTION

1. Field of the Invention

The invention relates generally to power tools and appliances including commutator-type electric motors employing carbon brushes, and more particularly to holding arrangements for those brushes.

2. Reference to Prior Art

Small motors are commonly used in electric appliances, power tools and the like. Such a motor typically includes an armature surrounded by a field winding. The armature includes a bearing-supported armature shaft and a commutator mounted on one end of the shaft. The electric circuit between a power supply and the commutator is completed by carbon brushes that are wired to the field. The brush slides along the commutator as the armature shaft rotates to maintain an electrical connection.

The use of brush holding assemblies for holding brushes in place against a commutator are also known. One such assembly includes a tubular holder and a carbon brush supported in the holder for sliding movement relative thereto. The brush protrudes through a mouth at one end of the holder to engage the commutator. The brush holding assembly also includes a coil spring for biasing the brush toward engagement with the commutator to maintain good electrical contact between the brush and the commutator. An example of such a brush holding assembly is provided in U.S. Pat. No. 4,246,508.

It is also known to incorporate plug-in terminals into brush holding assemblies to avoid the need to rewire the units after their replacement. An example of this type of arrangement is provided in U.S. Pat. No. 4,963,779 which discloses brush holders stamped from sheet metal and including an integral terminal for direct plug-in connection of the brush holder to other motor elements. An example of another brush holding device including plug-in terminals is shown in U.S. Pat. No. 4,075,523.

In prior art brush holding assemblies there is a danger that the brush may fall out of the housing after significant brush wear and that the spring or other parts of the assembly may contact the commutator and cause damage thereto. Prior art arrangements such as are disclosed in above-mentioned U.S. Pat. No. 4,246,508 for restraining brush movement after the brush wears to a predetermined point have been generally unsatisfactory due to their unreliability, cost of assembly and complexity. Also, brushes are not assembled in the foregoing prior art brush holder assemblies so as to be prevented from falling out of the assemblies prior to installation. Thus, one must take care to ensure that the brush remains in the holding assembly and does not fall out and become lost or damaged.

SUMMARY OF THE INVENTION

The invention provides an improved brush cartridge for use in appliances, power tools and other devices employing commutator-type motors. The improved brush cartridge is produced as a self-contained modular unit with a minimum number of readily assembled and economically produced parts, and the brush cartridge is designed to permanently retain the brush within the unit at all times so that the brush remains in place both prior to and during use. Also, the improved brush cartridge is modular and can be snapped or plugged into and out of its operative position during product assembly or brush replacement without concomitant wiring.

Thus, the improved brush cartridge is more suitable than prior art brush holding arrangements for high volume, low cost and automated production of devices in which motors are used. Due to its low cost of production, the improved brush cartridge can be discarded after use.

In one embodiment the improved brush cartridge includes a housing that is made of a conductive material. The housing includes a terminal that can be easily snapped or plugged into and out of a corresponding terminal on an electrical device to electrically incorporate the cartridge into the device's circuitry. This eliminates wiring associated with the installation and replacement of brushes in some prior art arrangements and therefore contributes to decreased assembly and repair time and costs. The cartridge also includes a brush which is supportable in the housing for sliding movement and a spring for biasing the brush toward engagement, once installed in an electrical device, with a commutator. To electrically interconnect the housing and the brush, a flexible shunt is attached on one end directly to the brush and on the other end to the housing. The shunt acts as a harness or leash to limit the range of movement of the brush so that it cannot be removed from the housing without disassembling the cartridge. In particular, the shunt is long enough to permit brush movement toward the commutator to maintain good electrical contact therewith as long as the brush is not excessively worn. When the brush reaches a predetermined wear point the shunt counteracts the spring to prevent further movement of the brush toward the commutator. At this point the brush cartridge is replaced.

More particularly, the invention provides a brush cartridge for use with an electric motor. The brush cartridge includes a housing that is made of an electrically conductive material and that includes a tubular portion defining a mouth. The brush cartridge also includes a brush supported in the tubular portion for sliding movement relative thereto. A portion of the brush protrudes from the mouth of the tubular portion and is engagable with a commutator. The brush cartridge also includes an electrically conductive flexible member that is connected between the housing and the brush. The flexible member or shunt limits the range of sliding movement of the brush to prevent its removal from the tubular portion of the housing.

The invention also provides a power tool including a motor housing, a motor, such as a conventional commutator-type motor for example, supported in the motor housing, and a brush cartridge electrically connected to the commutator of the motor. The brush cartridge includes a brush housing that is made of an electrically conductive material and that includes a tubular portion. The brush cartridge also includes an electrically conductive brush supported in the tubular portion for sliding movement relative thereto, and a portion of the brush protrudes from the tubular portion and engages the commutator. The brush cartridge further includes an electrically conductive flexible member connected between the brush housing and the brush. The flexible member permanently retains the brush in the tubular portion so that it cannot fall out of the cartridge.

The invention further provides a power tool including a motor housing and a motor supported in the motor housing. The motor includes a conventional field provided with a terminal and a conventional armature including a commutator. The power tool also includes a bus bar supported on the motor housing and including first and second terminals, the first of which is plugged into the field terminal. The power tool also includes a brush cartridge for completing the electrical connection between the field and the commutator. The brush cartridge includes a brush housing made of an electrically conductive material and including a tubular portion having an axis and a terminal formed as an integral part of the brush housing. The terminal of the brush housing is plugged into the second terminal of the bus bar. The brush cartridge also includes an electrically conductive brush supported in the tubular portion for sliding movement relative thereto in the direction of the axis. The brush cartridge further includes a spring member supported on the housing for biasing the brush in a first direction parallel to the axis and so that the brush engages the commutator. To electrically connect the brush housing and the brush, an electrically conductive flexible member is connected therebetween. The flexible member also acts to restrain movement of the brush to prevent its removal from the tubular portion.

Other features and advantages of the invention will become apparent to those skilled in the art upon review of the following detailed description, claims and drawings.

Figure 1:
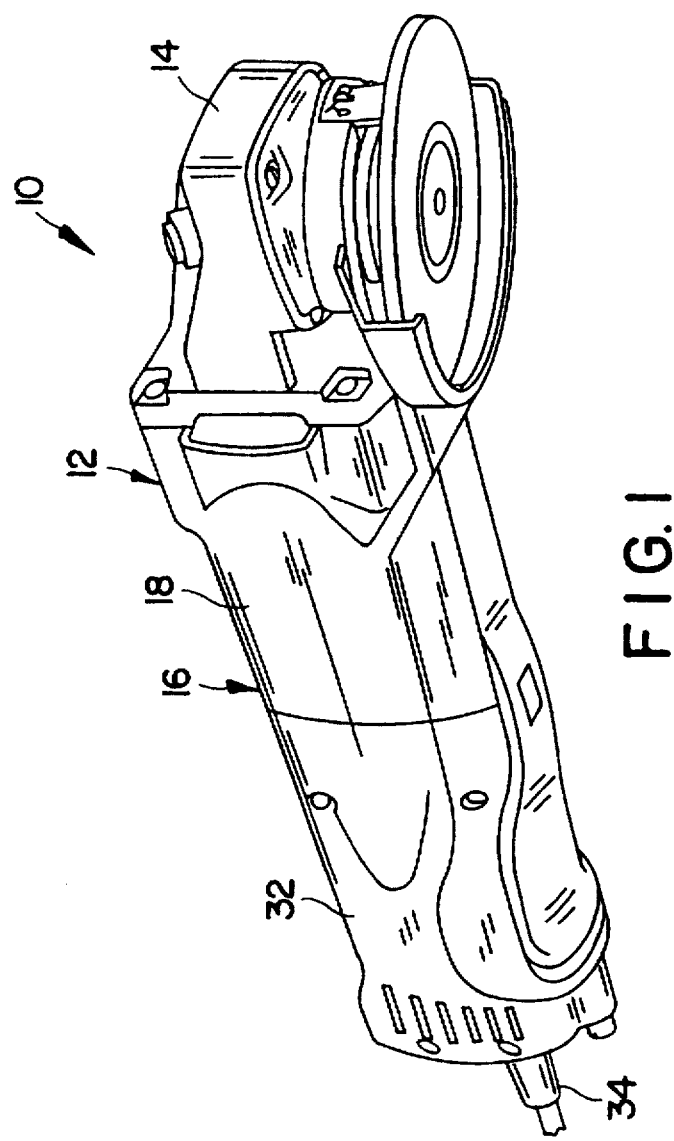
FIG. 1 is a perspective view of a motor-driven electrical device embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Figure 2:
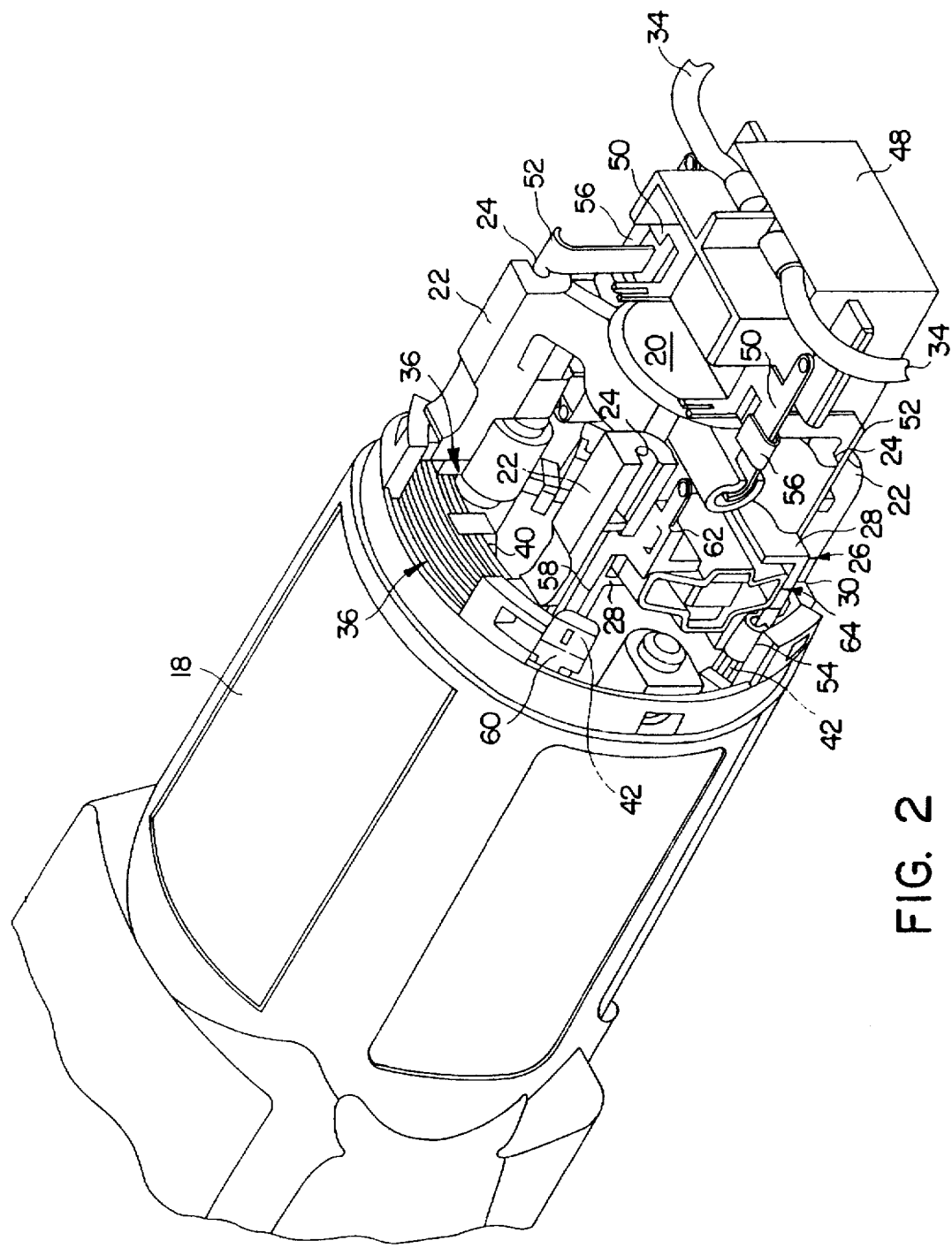
FIG. 2 is an enlarged perspective view of the rear part of the device shown in FIG. 1 with the rear portion of the device's housing removed.
Figure 3:
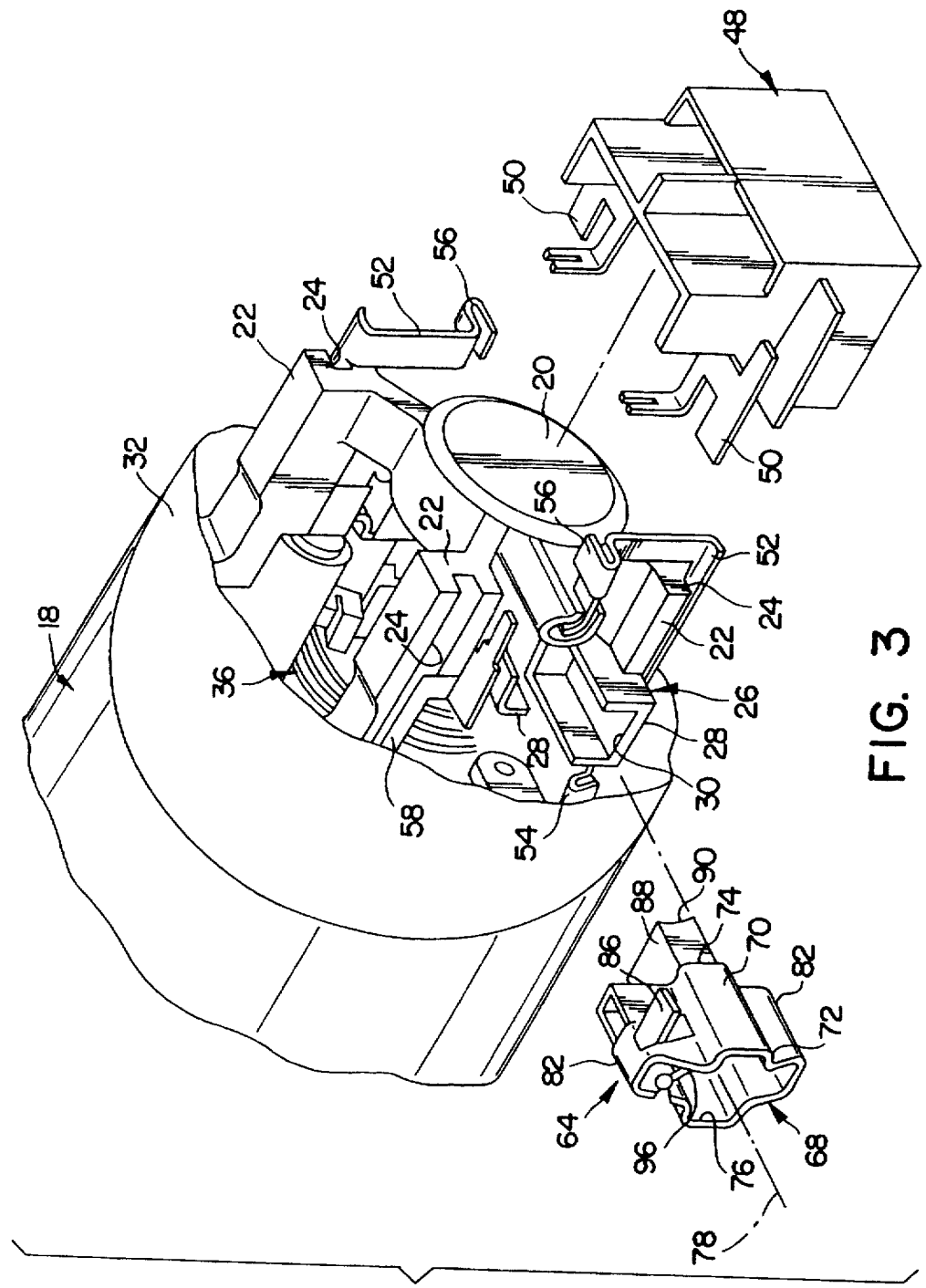
FIG. 3 is a further enlarged and partially exploded view of the rear part of the device of FIG. 1.

Shown in FIG. 1 is an electrical device which in the illustrated embodiment is a portable angle grinder 10. The grinder 10 includes a housing 12 having a gear case 14 and a motor housing 16 mounted on the gear case 14. The motor housing 16 includes a molded plastic front portion 18 which extends from the gear case 14. As shown in FIGS. 2 and 3, the front portion 18 includes a bearing support cup 20 molded to the rear ends of a set of four rearwardly extending support legs 22 (only three of which are shown). Each of the support legs 22 defines a channel 24 for reasons more fully explained below. The front portion 18 of the housing 12 also includes a pair of diametrically opposite brush cartridge mounting structures 26 (only one is shown) molded to the support legs 22. Each of the mounting structures 26 is formed by an opposing pair of support members 28 that extend from an adjacent pair of the support legs 22. Each pair of support members 28 define a mounting slot or channel 30.

As shown in FIG. 1, the motor housing 16 also includes a rear portion 32 mounted on the rear end of the front portion 18. In the illustrated arrangement the rear portion 32 is split into two molded halves that are secured together on the front portion 18 with fasteners (not shown), and a power supply cord assembly 34 extends from the rear portion 32 to supply power to the grinder 10.

The grinder 10 also includes a motor 36 (a portion of which is shown in FIGS. 2 and 3) which in the particular embodiment illustrated in the drawings is a commutator-type motor. Briefly, the motor 36 includes a stator assembly having (FIG. 2) a field 40 mounted in the front portion 18 of the motor housing 16. The field 40 is provided with four terminals 42 (only two of which are shown in FIG. 2). The motor 36 is also provided with an armature including an armature shaft 44 (FIGS. 5 and 6) supported by bearings (not shown), one of which is mounted in the bearing support cap 20. The armature also includes armature windings (not shown) connected to a commutator 46 (FIGS. 5 and 6) mounted on the armature shaft 44. The foregoing motor construction is well known in the art and will not be further described.

The grinder 10 also includes circuitry for electrically connecting the motor 36 to the power supply cord assembly 34. That circuitry includes a modular switch assembly 48 which can be snapped onto the front portion 18 of the motor housing 16 using means not shown. As shown in FIG. 2, the switch assembly 48 is electrically connected to the power supply cord assembly 34 and includes a pair of terminals 50. The switch assembly 48 is also electrically connected to the field 40 by a pair of bus bars 52 each supported in one of the channels 24 of a diametrically opposite pair of the support legs 22. Each of the bus bars 52 is provided with a first female terminal 54 mounted on one of the field terminals 42 and a second female terminal 56 mounted on one of the terminals 50 of the switch assembly 48. The motor's circuitry also includes a pair of additional bus bars 58 (only one of which is shown) each supported in one of the two remaining channels 24 in the support legs 22. Each of the bus bars 58 includes a first female terminal 60 mounted on one of the two remaining field terminals 42 and a second female terminal 62 positioned adjacent one of the brush cartridge mounting structures 26.

To connect the armature into the motor's circuit the grinder 10 also includes a (FIG. 5) pair of modular brush cartridges 64 and 66. In the illustrated arrangement the brush cartridges 64 and 66 are identical and only brush cartridge 64 will be explained in detail.

Figure 4:
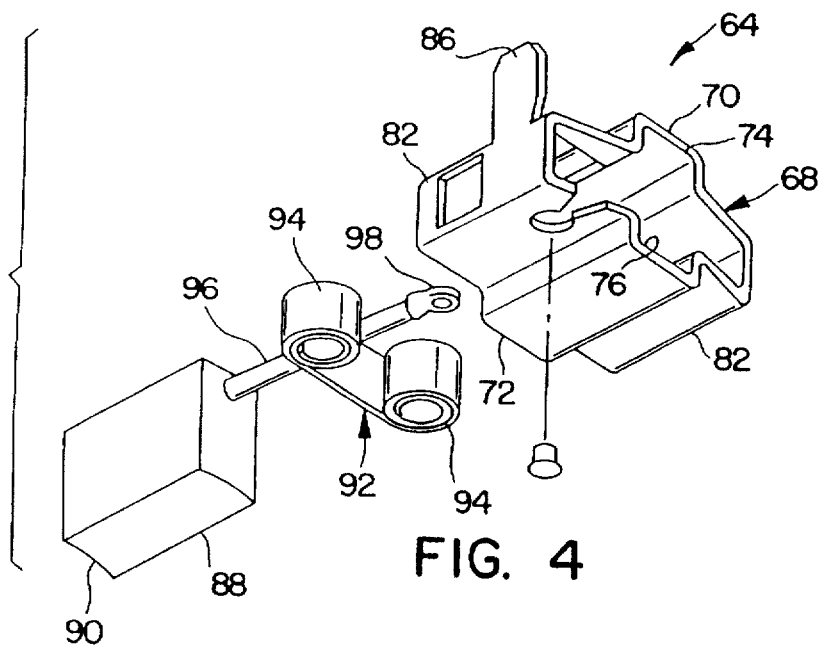
FIG. 4 is an exploded view of a brush cartridge used in the arrangement illustrated in FIGS. 2 and 3.

As shown in FIG. 4, the brush cartridge 64 includes a brush housing 68 that is preferably stamped from a tubular section of electrically conductive material such as copper, for example. The brush housing 68 includes a central generally tubular portion 70 having opposite open end portions 72 and 74 and defines a rectangular channel 76 having an axis 78 and (FIGS. 5 and 6) a mouth 80. The brush housing 68 also includes opposite side portions 82. Parts of each of the side portions 82 are punched or otherwise deformed to provide spring seats 84 for reasons that will be further explained below. The brush housing 68 is also provided with a snap or plug-in electrical connection member which in the particular embodiment illustrated in the drawings is a tab or terminal 86. The terminal 86 is preferably formed by punching and deforming one of the side portions 82.

The brush cartridge 64 also includes an electrically conductive carbon brush 88 that has a generally rectangular cross-section to fit somewhat snugly into the channel 76 of the tubular portion 70 for sliding movement relative thereto. The brush 88 includes a concaved end portion 90 that protrudes from the mouth 80 of the brush housing 68 to engage the commutator 46, as is further explained below.

Figure 5:
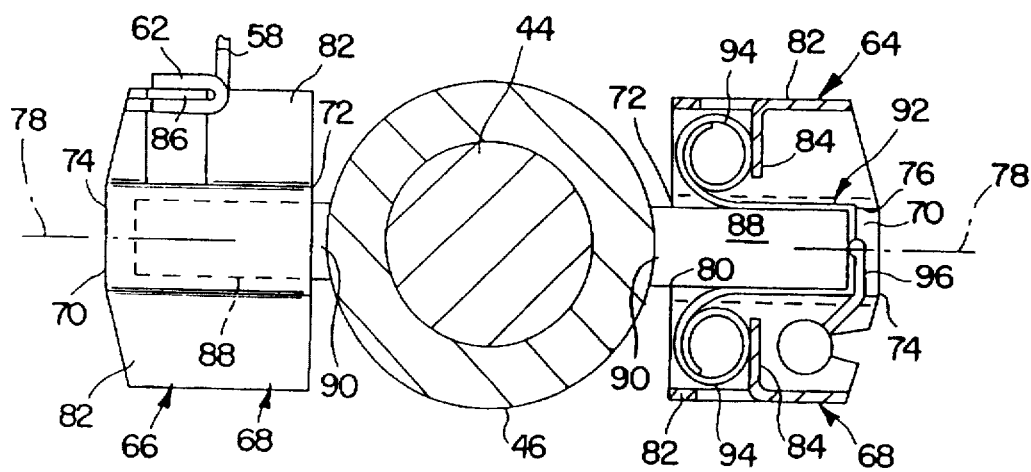
FIG. 5 is a side view, partially in section, of a pair of the brush cartridges illustrated in FIG. 4 and shown in operative engagement with the commutator of the motor employed in the device illustrated in FIG. 1.
Figure 6:
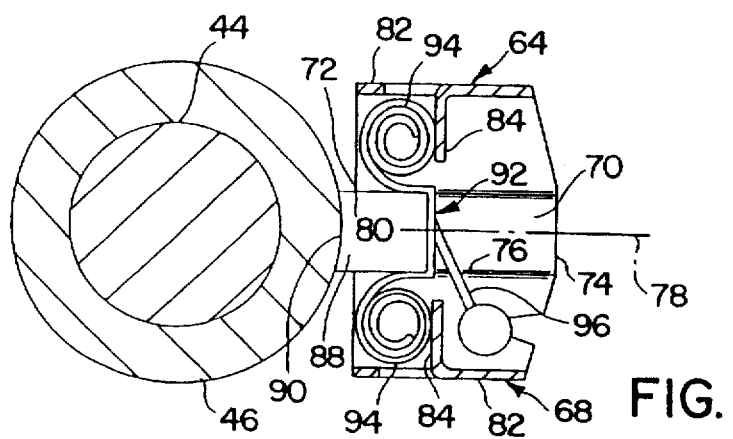
FIG. 6 is a view similar to FIG. 5 but shows only a single brush cartridge (for illustrative convenience) having a worn brush.

To bias the brush 88 toward the commutator 46 when the brush cartridge 64 is placed in an operative position in the grinder 10, the brush cartridge 64 also includes means for biasing brush movement toward the mouth 80 of the brush housing 68 (and toward the commutator 46). In the particular embodiment illustrated in the drawings the means for biasing brush movement includes a spring member 92. In the illustrated arrangement the spring member 92 is a stainless steel constant force ribbon spring which extends over the outer end of the brush 88 and which includes twin coils 94 each seated on one of the spring seats 84. With reference to FIGS. 5 and 6, this arrangement prevents withdrawal of the brush 88 through the outer end portion 74 of the brush housing 68 and also prevents removal of the spring member 92 when the brush 88 is in place in the brush housing 68.

The brush cartridge 64 further includes an electrically conductive flexible member, such as a wire shunt 96, for electrically interconnecting the brush housing 68 and the brush 88. The shunt 96 is connected at one end directly to the brush 88 and is riveted or otherwise suitably fastened to the brush housing 68 at its other end. In the illustrated arrangement the shunt 96 is provided with an optional eyelet 98 used in securing the shunt 96 in place.

The shunt 96 functions as a means for limiting the range of sliding movement of the brush 88 to prevent its removal from the tubular portion 70 of the brush housing 68 both before and after the brush cartridge 64 is installed. In particular, as shown with reference to FIG. 5, the shunt 96 (and the spring member 92) limits sliding movement of the brush 88 in a first direction parallel to the axis 78 and toward outer end portion 74 so that the brush 88 cannot be withdrawn from the brush housing 68 via outer end 74. As shown with reference to FIG. 6, as the brush 88 slides in a second direction (opposite the first direction) parallel to the axis 78 and outwardly of the mouth 80 the shunt 96 tightens to also limit the range of movement of the brush 88 in that direction so that the brush 88 cannot be withdrawn via the mouth 80.

To install the brush cartridge 64, the side portions 82 of the brush housing 68 are aligned with the rectangular channel 30 of one of the mounting structures 26 so that the terminal 86 of the brush housing 68 is also aligned with the terminal 62 on the corresponding one of the bus bars 58 (see FIG. 3). The brush cartridge 64 is then inserted into the mounting structure 26 to an installed position (FIG. 2) so that the side portions 82 are received in the channel 30. When this is done the terminal 86 is automatically snapped or plugged into the corresponding terminal 62 to electrically interconnect the brush cartridge 64 and the field 40. As shown in FIG. 5, when the brush cartridge 64 is installed the axis 78 (and the brush 88) is generally perpendicular to the axis of the armature shaft 44 and the spring member 92 automatically holds the end portion 90 of the brush 88 in contact with the commutator 46 to establish an electrical connection therebetween.

Once the brush cartridge 64 is installed in a selected one of the mounting structures 26, it is held in position by that structure and the side portions 82 of the brush housing 68 which limit movement of the brush cartridge 64 in a direction transverse to the axis 78. The brush cartridge 64 is also held in place by the engagement of the terminals 86 and 62 which restricts withdrawal of the brush cartridge 64 in a direction parallel to the axis 78.

Brush cartridge 66 is installed and held in position in the same manner as brush cartridge 64. The only difference is that when installed, brush cartridge 66 is (see FIG. 5) rotated 180 degrees with respect to brush cartridge 64.

After installation of the brush cartridges 64 and 66, the twin halves of the rear portion 32 of the motor housing 16 are reassembled on the front portion 18 of the motor housing 16. If desired, the halves of the rear portion 32 can be designed so that when secured in place they engage the brush cartridges 64 and 66 to further secure the brush cartridges 64 and 66 in position.

As the brush 88 in brush cartridge 64 wears it shrinks in size and is advanced toward the commutator 46 to maintain electrical contact. When the brush 88 reaches a predetermined size the shunt 96 will prevent further brush movement toward the commutator 46, resulting in interrupted of motor operation. To replace the brush 88, the rear portion 32 of the motor housing 16 is disassembled and the old brush cartridge 64 is removed and replaced with a new one as described above. The old brush cartridge 64 can then be discarded. Brush cartridge 66 is replaced in the same way.

While in the illustrated arrangement the brush cartridges 64 and 66 are used in connection with a motor employed in an angle grinder 10, it will be understood by those skilled in the art that a brush cartridge arrangement embodying the invention could be employed in any appliance, tool or device that includes a commutator-type electric motor.

Advantageously, the brush cartridges 64 and 66 are modular units which can be quickly plugged into position and unplugged when in need of replacement. Those cartridges have a simple four-piece construction (brush housing 68, brush 88, spring member 92 and shunt 96) and utilize inexpensive components that are arranged so that the brush cartridge will not fall apart or become disassembled either before or after use.

Various features of the invention are set forth in the following claims.

We claim:

1. A power tool comprising:
   a motor housing,
   a motor supported in the motor housing, the motor including a commutator, and
   a brush cartridge electrically connected to the commutator, the brush cartridge including a one-piece brush housing made of an electrically conductive material, the brush housing including a tubular portion having an end adjacent to the commutator and an opposite end spaced from the end adjacent the commutator, an electrically conductive brush supported in the tubular portion for sliding movement relative thereto, a portion of the brush protruding from the end of the tubular portion adjacent to the commutator, said portion of the brush engaging the commutator, an electrically conductive flexible member connected between the one-piece brush housing and the brush, the flexible member having a length which limits sliding movement of the brush such that the brush cannot be removed from either end of the tubular portion without disconnecting the flexible member from the brush housing, and a plug-in electrical connection member integrally formed from the one-piece brush housing.

2. A power tool as set forth in claim 1 wherein the brush cartridge includes a spring member, the spring member being supported on the brush housing, the spring member engaging the brush, and the spring member biasing the brush toward engagement with the commutator, and wherein the brush housing and the flexible member permanently retain the spring member within the brush housing.

3. A power tool as set forth in claim 1 wherein the brush cartridge includes a spring member supported on the brush housing and engaging the brush, wherein the tubular portion defines a channel, the channel including an axis, wherein the brush is received in the channel, the brush being biased outwardly from the brush housing by the spring member in a direction parallel to the axis, wherein the motor housing includes a mounting slot, and wherein the brush housing includes a pair of side portions received in the mounting slot to restrict movement of the brush housing relative to the motor housing in a direction transverse to the axis.

4. A power tool as set forth in claim 3 wherein the brush housing includes a plug-in electrical connection member, wherein the motor includes a field, the field having a terminal, wherein the power tool includes a bus bar, the bus bar including a first terminal mounted on the terminal of the field, and a second terminal mounted on the plug-in electrical connection member of the brush housing to electrically connect the brush housing to the field, and wherein engagement of the plug-in electrical connection member and the second terminal restricts movement of the brush housing relative to the motor housing in a direction parallel to the axis.

5. A brush cartridge as set forth in claim 1 wherein the brush housing includes a plug-in electrical connection member having a terminal stamped from the brush housing.

6. A brush cartridge for use with an electric motor, the brush cartridge comprising:
- a housing made of an electrically conductive material, the housing including a tubular portion defining a mouth, and first and second opposite side portions adjacent the tubular portion, the side portions including respective first and second tabs integral with the housing and forming first and second spring seats, respectively,
- a spring member, having respective first and second ends engaging the first and second spring seats, respectively,
- a brush supported in the tubular portion for sliding movement relative thereto, a portion of the brush protruding from the mouth of the tubular portion, said portion of the brush being engagable with a commutator, and
- an electrically conductive flexible member connected between the housing and the brush, the flexible member having a length which limits the range of sliding movement of the brush and prevents removal of the brush from the tubular portion.

7. A brush cartridge as set forth in claim 6 wherein the brush cartridge includes a spring member, the spring member being supported on the housing, the spring member engaging the brush, and the spring member biasing the brush outwardly from the mouth so that when the brush cartridge is positioned adjacent a commutator the brush is biased toward the commutator.

8. A brush cartridge as set forth in claim 7 wherein the housing, the brush and the flexible member cooperate to permanently retain the spring member within the housing.

9. A brush cartridge as set forth in claim 7 wherein the flexible member provides a means cooperating with the housing for preventing removal of the spring member from the housing.

10. A brush cartridge as set forth in claim 7 wherein the tubular portion defines a channel, the channel including an axis, wherein the brush is received in the channel, the brush being biased outwardly from the mouth of the housing in a direction parallel to the axis, and wherein the housing includes means for supporting itself on a mounting structure, the means for supporting the housing on a mounting structure including the first and second side portions, the side portions being engagable with the mounting structure to restrict movement of the housing relative to the mounting structure in a direction transverse to the axis when the brush cartridge is mounted on the mounting structure.

11. A brush cartridge as set forth in claim 6 wherein the housing includes a plug-in electrical connection member for electrically connecting the flexible member to an outside electrical source.

12. A brush cartridge as set forth in claim 11 wherein the plug-in electrical connection member includes a terminal extending integrally from the housing, the terminal being formed by deforming a portion of the housing.

13. A brush cartridge as set forth in claim 12 wherein the spring member is supported on the housing, the spring member engages the brush, and the spring member biases the brush outwardly from the mouth so that when the brush cartridge is positioned adjacent a commutator the brush is biased toward the commutator, and wherein the housing, the brush and the flexible member cooperate to permanently retain the spring member within the housing.

14. A power tool comprising:
- a motor housing,
- a motor supported in the motor housing, the motor including a field, the field including a terminal, and an armature, the armature including a commutator,
- a bus bar supported on the motor housing, the bus bar including a first terminal plugged into the terminal of the field, and a second terminal, and
- a brush cartridge for completing the electrical connection between the field and the commutator, the brush cartridge including a brush housing made of an electrically conductive material, the brush housing including a tubular portion, the tubular portion having an axis, and a terminal formed as an integral part of the brush housing, the terminal of the brush housing being plugged into the second terminal of the bus bar, an electrically conductive brush supported in the tubular portion for sliding movement relative thereto in the direction of the axis, a portion of the brush protruding from the tubular portion, said portion of the brush engaging the commutator, a spring member, the spring member being supported on the housing, and the spring member biasing the brush in a first direction parallel to the axis and toward engagement with the commutator, and an electrically conductive flexible member connected between the brush housing and the brush, the flexible member preventing removal of the brush from the tubular portion in the first direction.

15. A power tool as set forth in claim 2 wherein the brush housing, the brush, and the flexible member cooperate to permanently retain the spring member within the housing, and wherein the spring member and the flexible member prevent removal of the brush from the tubular portion in a second direction opposite the first direction so that the brush is permanently retained in the brush housing.

16. A power tool as set forth in claim 15 wherein the motor housing includes opposed mounting slots, wherein the brush housing includes a pair of side portions received in the mounting slots to restrict movement of the brush housing relative to the motor housing in a direction transverse to the axis, and wherein engagement of the terminal of the brush housing and the second terminal of the bus bar restricts movement of the brush housing relative to the motor housing in a direction parallel to the axis.

17. A power tool comprising:

a motor housing including a mounting slot and at least one electrical connection member supported by said motor housing, a motor supported in the motor housing, the motor including a commutator, and a brush cartridge electrically connected to the commutator, the brush cartridge including a brush housing made of an electrically conductive material, the brush housing including a tubular portion defining a channel having an axis, an electrically conductive brush supported in the channel for sliding movement relative to the tubular portion, an electrically conductive flexible member connected between the brush housing and the brush, a spring member biasing the brush outwardly from the brush housing in a direction parallel to the axis, a pair of side portions received in the mounting slot to restrict movement of the brush housing relative to the motor housing in a direction transverse to the axis, and a terminal integrally formed from a portion of said brush housing so that when said brush cartridge is inserted into said mounting slot, said terminal is electrically connected to said electrical connection member.

18. A power tool as set forth in claim 17 wherein the spring member is supported on the brush housing, wherein the spring member engages the brush, wherein the spring member biases the brush toward engagement with the commutator, and wherein the brush housing and the flexible member cooperate to permanently retain the spring member within the brush housing.

19. A power tool as set forth in claim 17 wherein the brush housing includes a plug-in electrical connection member, wherein the motor includes a field, the field having a terminal, wherein the power tool includes a bus bar, the bus bar including a first terminal mounted on the terminal of the field, and a second terminal mounted on the plug-in electrical connection member of the brush housing to electrically connect the brush housing to the field, and wherein engagement of the plug-in electrical connection member and the second terminal restricts movement of the brush housing relative to the motor housing in a direction parallel to the axis.

20. A brush cartridge as set forth in claim 17 wherein the brush housing includes a plug-in electrical connection member.

21. A brush cartridge as set forth in claim 20 wherein the plug-in electrical connection member includes a terminal stamped from the brush housing.

22. A brush cartridge for use with an electric motor, the brush cartridge comprising:

a housing made of an electrically conductive material, the housing including a tubular portion defining a mouth, and an end portion spaced from the mouth, a brush supported in the tubular portion for sliding movement relative thereto, a portion of the brush protruding from the mouth of the tubular portion, said portion of the brush being engagable with a commutator, and an electrically conductive flexible member connected between the housing and the brush, the flexible member having a length which limits the range of sliding movement of the brush such that the brush cannot be removed from either one of the mouth and the opposite end of the tubular portion without disconnecting the flexible member from the brush housing, and wherein the housing further includes a plug-in electrical connection member for electrically connecting the flexible member to an outside electrical source, the plug-in electrical connection member including a terminal extending integrally from the housing, the terminal being formed by deforming a portion of the housing.

23. A brush cartridge as set forth in claim 22 wherein the brush cartridge includes a spring member, the spring member being supported on the housing, the spring member engaging the brush, and the spring member biasing the brush outwardly from the mouth so that when the brush cartridge is positioned adjacent a commutator the brush is biased toward the commutator.

24. A brush cartridge as set forth in claim 23 wherein the housing, the brush and the flexible member cooperate to permanently retain the spring member within the housing.

25. A brush cartridge as set forth in claim 23 wherein the flexible member provides a means cooperating with the housing for preventing removal of the spring member from the housing.

26. A brush cartridge as set forth in claim 23 wherein the tubular portion defines a channel, the channel including an axis, wherein the brush is received in the channel, the brush being biased outwardly from the mouth of the housing in a direction parallel to the axis, and wherein the housing includes means for supporting itself on a mounting structure, the means for supporting the housing on a mounting structure including a pair of side portions, the side portions being engagable with the mounting structure to restrict movement of the housing relative to the mounting structure in a direction transverse to the axis when the brush cartridge is mounted on the mounting structure.

27. A brush cartridge as set forth in claim 22 wherein the brush cartridge includes a spring member, the spring member being supported on the housing, the spring member engaging the brush, and the spring member biasing the brush outwardly from the mouth so that when the brush cartridge is positioned adjacent a commutator the brush is biased toward the commutator, and wherein the housing, the brush and the flexible member cooperate to permanently retain the spring member within the housing.

* * * * *